United States Patent
Neufeld

(12)
(10) Patent No.: US 6,394,699 B1
(45) Date of Patent: May 28, 2002

(54) APPARATUS FOR REDUCED FLOW FISH PASSAGE

(76) Inventor: Norman R. Neufeld, 912-168th Ave. NE., Bellevue, WA (US) 98008

( * ) Notice: Subject to any disclaimer, the term of this patent is extended or adjusted under 35 U.S.C. 154(b) by 0 days.

(21) Appl. No.: 09/628,982

(22) Filed: Jul. 20, 2000

Related U.S. Application Data

(60) Provisional application No. 60/146,036, filed on Jul. 28, 1999.

(51) Int. Cl.[7] ............................................. E02B 8/08
(52) U.S. Cl. ............................ 405/81; 405/80; 405/83
(58) Field of Search ............................ 137/363, 372; 119/219; 138/109, 118, 118.1; 405/102, 127, 107, 115, 36, 52, 83, 81, 60, 80, 82; E02B 8/08

(56) References Cited

U.S. PATENT DOCUMENTS

| | | | | |
|---|---|---|---|---|
| 3,596,468 A | * | 8/1971 | Fairbanks | 405/83 |
| 4,740,105 A | * | 4/1988 | Wollander | 405/83 |
| 4,904,114 A | * | 2/1990 | Warner et al. | 405/82 |
| 5,161,913 A | * | 11/1992 | Boylan | 405/83 |
| 5,632,572 A | * | 5/1997 | Chicha | 405/81 |
| 5,660,499 A | * | 8/1997 | Bethune | 405/83 |
| 5,947,640 A | * | 9/1999 | Connors | 405/83 |
| 6,155,746 A | * | 12/2000 | Peters | 405/81 |

FOREIGN PATENT DOCUMENTS

| | | | | |
|---|---|---|---|---|
| EP | | 0879957 A1 | * 11/1998 | F03B/11/00 |
| WO | | WO-98/58130 | * 12/1998 | E02B/8/08 |

OTHER PUBLICATIONS

Fisher Rosemount web catalogue, Oct. 1998, PF51.1:E, ease–e ® Globe–Style Control Valves; pp. 1–28 plus web page with address.*
DeZurik Bulletin 32.00–2, May 1999, from website, KGU Urethane Knife Gate Valves—Techinical Specifications.*

* cited by examiner

*Primary Examiner*—David Bagnell
*Assistant Examiner*—Katherine Mitchell

(57) ABSTRACT

The present invention provides an apparatus for reduced flow rate fish passage around dams or other obstructions, having a passage unit with a tubular passageway, an upstream valve, a downstream valve and an optional main valve, a fabricated base, and an additional passageway having a valve. The valves have an opening, a closing means, a valve stem, and an operator. The apparatus has an access pipe and an attraction flow device.

27 Claims, 8 Drawing Sheets

US 6,394,699 B1

APPARATUS FOR REDUCED FLOW FISH PASSAGE

This application claims the benefits under 35 U.S.C. 119(e) of previously filed provisional application, Ser. No. 60/146,036 filed Jul. 28, 1999.

BACKGROUND OF THE INVENTION

Dams, pollution, deforestation, and urban sprawl have all taken, and continue to take, their toll on streams used by migrating fish, such as salmon and steelhead trout. Many migrating fish, such as certain species of Pacific salmon and other anadromous fish are now on the endangered list.

Impediments or obstructions, such as dams or culverts, have effectively blocked or greatly hindered upstream migration for many returning fish. Attempts to remedy this include fish ladders and complex and costly underground piping systems that run the length of migrating streams. Most of these systems or apparatus are costly and cannot be readily removed. Additionally, with most of these systems, the migrating fish generally must jump to avoid swing against great fluid pressure created by the differential of the head of the fluid level between the after-impediment water level and the pre-impediment water level. Typically, a series of height staggered concrete boxes are used to allow the fish to jump to the next height level. This causes the fish to be damaged, or at least, greatly exhausted. It is believed that the condition of the fish at the spawning location greatly impacts the long-term viability of the particular fish species.

Because fish migration is generally seasonal, depending on the species of fish, it is desired to have a portable, relatively inexpensive apparatus for transporting migrating fish past river or stream impediments that also reduces the flow rate on the migrating fish during differential fluid level acclimation.

SUMMARY OF THE INVENTION

The present invention relates to an apparatus for reduced flow rate fish passage to the fish as they swim against the current, resulting in the fish being less likely to be injured as they migrate past obstructions. Additionally, the method and apparatus for reduced flow fish passage of the present invention is economical, portable, and can be used for fish passage in both directions, i.e., upstream and downstream. The present invention is much less costly than conventional fish ladders, requires little maintenance, and is portable. Additionally, the present invention is environmentally compatible by being less disruptive than conventional permanent piping systems and fish ladders. The present invention requires only enough water flow to attract the migrating fish to a submersible entry and the fish need only to expend the energy to overcome the present internal (acclimation) flow.

The present invention provides an apparatus for reduced flow rate fish passage, comprising a passage unit having a tubular passageway or pipe, an upstream valve and a downstream valve being used to close off said passageway at or near each end of said passage unit, an alternative passageway and a fabricated base, said fabricated base supporting said passageways and aiding in spacing and supporting said pair of valves. The pair of valves have an opening, a closing means, a valve stem, and en operator to close off said opening. The passage unit is installed essentially parallel to and below the surface of a water body and adjacent to an obstruction of which the fish must pass. The pair of valves are synchronized for two-stage opening. An optional valve is provided, which optional valve is a main shut-off valve.

The apparatus for reduced flow rate fish passage has an access pipe. The apparatus for reduced flow rate fish passage has passageway sensors to send a signal to a remote controller for cycling of said upstream valve and said downstream valve. The upstream valve and downstream valve are of a variety of types of valves, such as a knife gate valve, an iron gate valve, a ball gate, or check gate, or any other valve that will close a cross-sectional opening and are capable of being manually controlled and operated or remotely pneumatically controlled. The apparatus for reduced flow rate fish passage has the passageways being extended to, through, or over said obstruction. The apparatus for reduced flow rate fish passage has a conventional attraction flow device.

It is therefore an object of the present invention to provide an apparatus for reduced flow rate fish passage that is relatively inexpensive and easily manufactured.

It is therefore a further object of the present invention to provide an apparatus for reduced flow rate fish passage that is relatively easily transported and moved as conditions require.

It is therefore a further object of the present invention to provide an apparatus for reduced flow rate fish passage that is adaptable for use with any type of obstruction to fish migration.

It is therefore a further object of the present invention to provide an apparatus for reduced flow rate fish passage that does not injure migrating fish as they pass obstacles in their migration.

These and further objects are satisfied by the apparatus for reduced flow rate fish passage of the present invention.

BRIEF DESCRIPTION OF THE DRAWINGS

In order that the new and improved apparatus for reduced flow rate fish passage of the present invention will be better understood and readily carried into effect, a preferred embodiment will now be described, by way of example only, with reference to the accompanying drawings wherein.

DESCRIPTION OF THE PREFERRED EMBODIMENT

Figure 1:
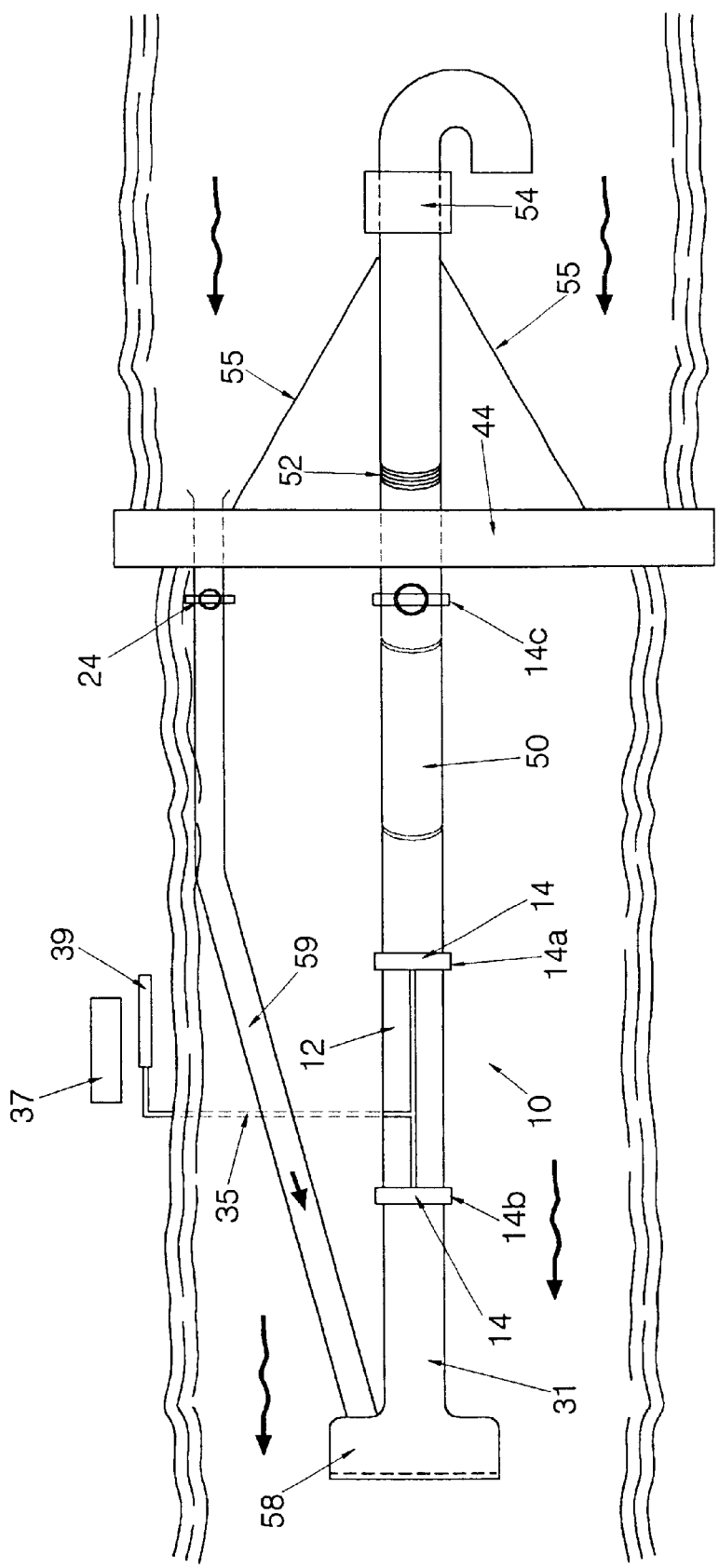
FIG. 1 is a plan view of a first embodiment apparatus of the present invention.
Figure 2:
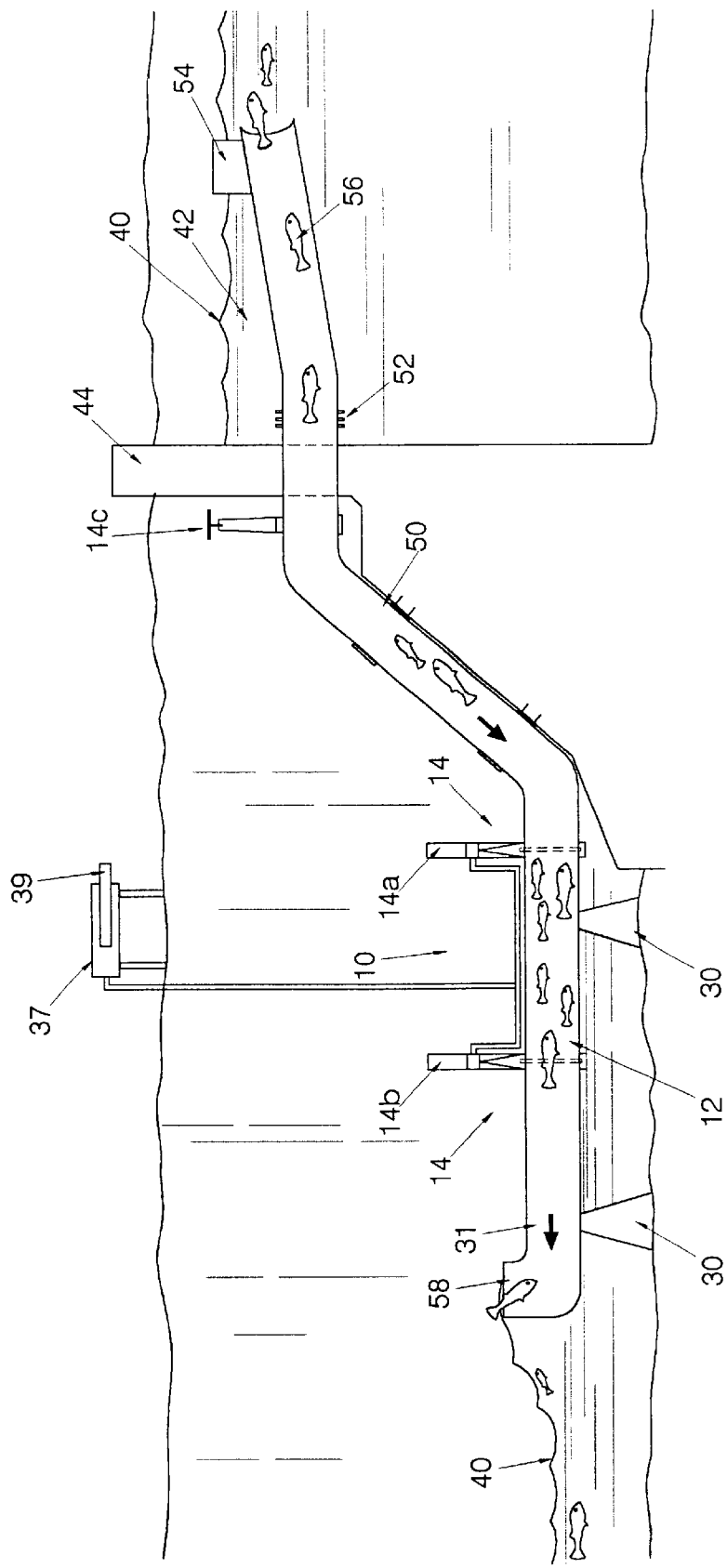
FIG. 2 is a section view of the apparatus of FIG. 1.

With reference now to the drawings, and as shown in FIGS. 1 through 13 thereof, preferred embodiments of the apparatus for reduced flow rate fish passage embodying the principals and concepts of the present invention are shown. Referring to FIGS. 1, 2, 9–13, the apparatus for reduced flow rate fish passage of the present invention includes a passage unit 10 having a tubular passageway, or pipe, 12 therein. The passage unit 10 includes a pair of valves 14 to close off the passageway 12 at or near each end of the passage unit 10. The upstream valve will be hereinafter referred to as valve 14a and the downstream valve will be hereinafter referred to as valve 14b.

The passage unit 10 may include a fabricated base 30 that supports the passageway 12 and aids in spacing and supporting valves 14a and 14b. The passageway 12 and valves 14a, 14b may be connected to base 30 by a plurality of support straps 32. Alternatively, the base 30 may include at least one stanchion (not shown) that is bolted or otherwise connected to the base 30, a box base support, or other commonly known mechanical support members.

An access pipe 31 may be added to the passage unit 10 as a waiting area for fish until valve 14b is opened.

The passage unit 10 may be in the range of four feet wide by five feet high. In preferred form, the length of the passage unit 10 between valves 14a and 14b should be in the range of 20–24 feet. Including the access pipe 31, the overall length of the passage unit 10 may be in the range of 40–42 feet. The passage unit 10 is approximately 24 inches in diameter for Pacific Northwest salmon. Such a passage unit 10 would have an overall weight of approximately 3500–4000 pounds. However, the number and size of the anticipated migratory fish will ultimately determine the optimal size/diameter of the passage unit 10. For example, a passage unit 10 with a passageway diameter of 30 inches and a longer overall length of 60 feet (30 feet for the passageway 12 between valves 14a and 14b, and 30 feet for the access pipe 31) might be used for sturgeon. Migratory fish instinctively know to go to the faster part of the stream. An additional passageway, or pipe, 59, from the obstruction 44 to the attraction flow device 58 is added to further provide greater attraction flow, thus better guiding the fish to the unit 10. The additional passageway 59 has a valve 24 to close off said additional passageway. The downstream spillover is used to guide the fish, such that the fish are tricked into thinking they are heading to the fastest part of the stream or water body.

The passageway 12 may be of any cross-sectional shape, such as oval, square, circular, rectangular, etc. However, a circular cross-section is the most standard and probably the least costly to manufacture. The passageway 12 may be made from a variety of materials such as plastic or noncorrosive metal. The passageway 12 could optionally be made from transparent material for visual observation of the fish as they enter the passage unit 10, however, the passageway 12 does not necessarily have to be transparent. Sensors may be added to the passageway 12 so as to be able to send a signal to a remote controller when sophisticated cycling of valves 14a and 14b is desired.

Valves 14a and 14b may be of a variety of types of valves, such as a knife gate valve, an iron gate valve, a ball gate, or check gate, or any other valve that will close a cross-sectional opening 20 of the passageway 12 and also be capable of partially closing in order to leave a small amount of fluid passing through valves 14a and 14b. Valves 14 could be a stainless steel knife gate valve. Valves 14, of whatever type, move from an open position in which fluid flows through the passageway 12, or pipe, through a valve opening 22 and a closed position wherein a knife blade, or ball or other closing means moves via a valve stem 26 and an operator 28 to close off the valve opening 22.

Figure 3:
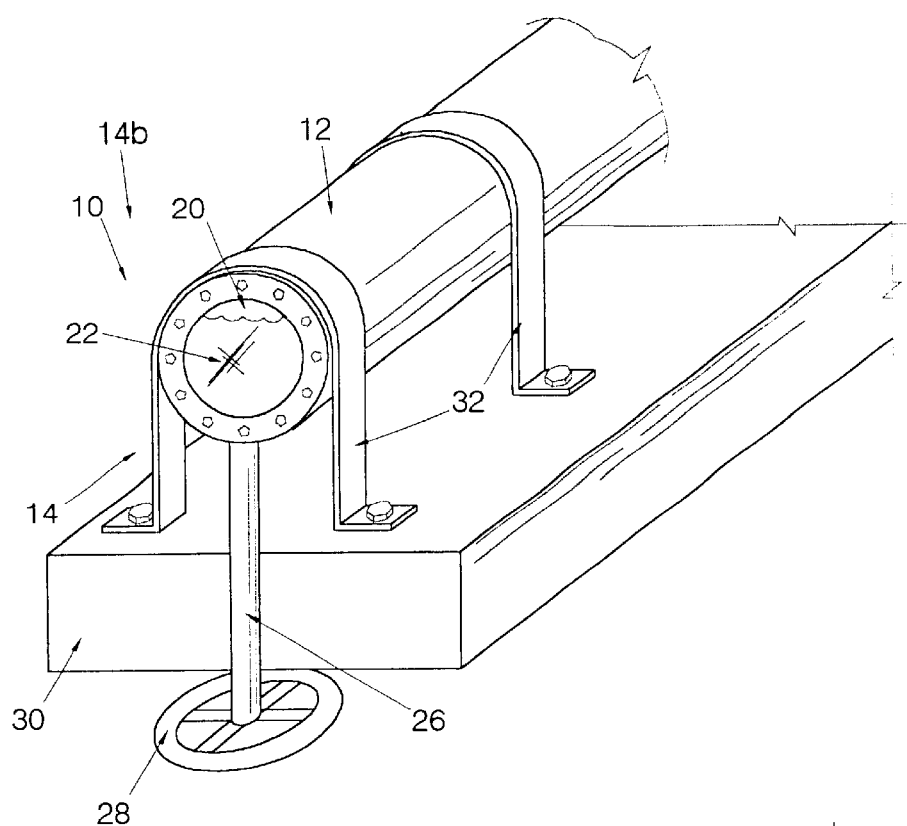
FIG. 3 is a perspective view of the downstream end of the apparatus of the present invention.
Figure 4:
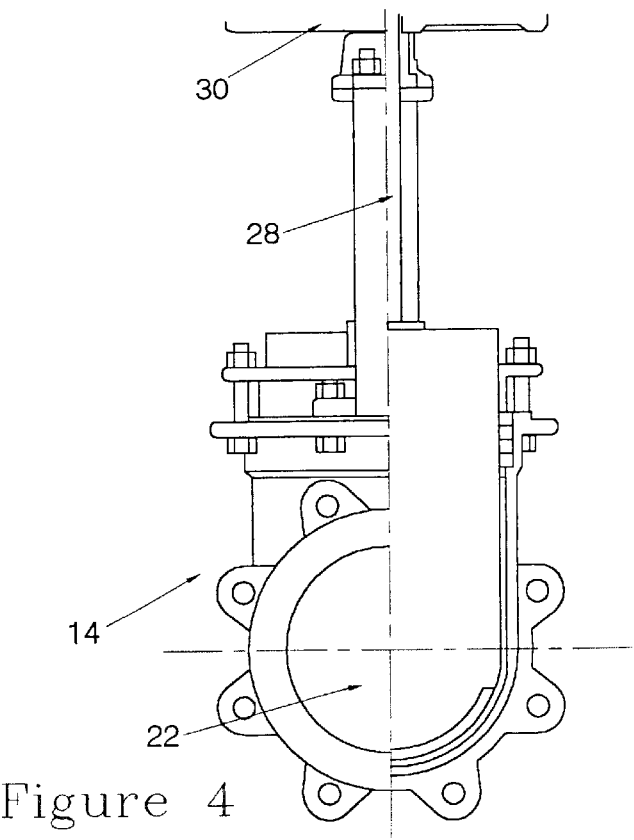
FIG. 4 is a front view of a knife gate valve of the apparatus of the present invention.
Figure 5:
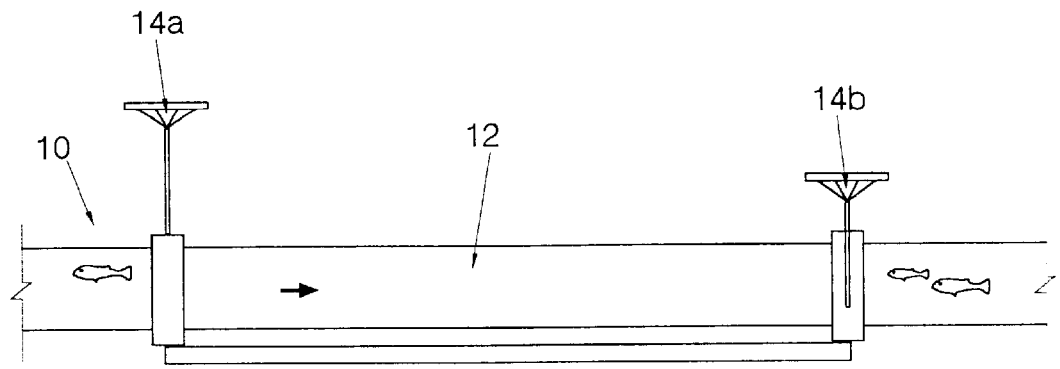
FIGS. 5–8 are schematic views of the valve cycling stages of the apparatus of the present invention.

According to one aspect of the present invention, the valve stems 26 of both valve 14a and 14b are positioned downward as shown in FIG. 3, although the apparatus of the present invention will still work adequately if the valve stems 26 are facing upward. An advantage of having the valve stems 26 face downward is that the valve stems 26 are less likely to become entangled with trees and debris floating in the stream or flowing body of water. Additionally, the resulting turbulence of the attraction flow from such placement would be positioned above the fish as they swim through the passage unit 10 as opposed to below the fish, which better stimulates natural turbulence fish experience swimming upstream.

Valves 14a and 14b may be manually controlled and operated, but it is preferable that they be remotely pneumatically controlled. A pneumatic line, either conduit or tube, shown schematically at 35, runs from each valve 14a and 14b to a remote control unit 37 and a compressor 39. An actuator, and a positioner, may be connected to the top of each of valves 14a and 14b. Additionally, a manual shut-off valve 14c may be located in the unit 10. An actuator and a positioner may also be connected to the top of valve 14c, if valve 14c is not manual. The actuator and positioner pneumatically activate the respective valves 14a, 14b, 14c from the control unit 37. The control unit 37 may be software controlled or electro-mechanically controlled. The compressor should be capable of producing at least 80 psi The migratory levels and the desired cycling time will dictate the parameters of the control unit. Because the control system would be within the knowledge of one of ordinary skill in the art, the control unit 37 structure will not be further discussed.

In use, the unit 10 is installed essentially parallel to and below the surface 40 of the water body 42 and adjacent to the obstruction 44 of which the fish must pass. Preferably, the unit 10 is installed as close to the obstruction 44 as feasible. The unit 10 could be installed for fish passage in either direction, although it is envisioned that the primary usage would be for upstream fish passage. The valves 14a and 14b are synchronized for two-stage opening as discussed in detail below.

Referring to FIGS. 5–8, in the first stage of upstream fish passage (FIG. 5), the upstream valve 14a is fully opened, whereas the downstream valve 14b is opened only far enough to create a substantially constant acclimation flow rate. Although the acclimation flow rate ultimately would be determined by a fish biologist, in a preferred form, the acclimation flow is formed from closing off approximately 95% of the valve opening. For a head of 20 feet and a passageway diameter of 24 inches, the acclimation flow is approximately 0.5 feet/second.

Figure 6:
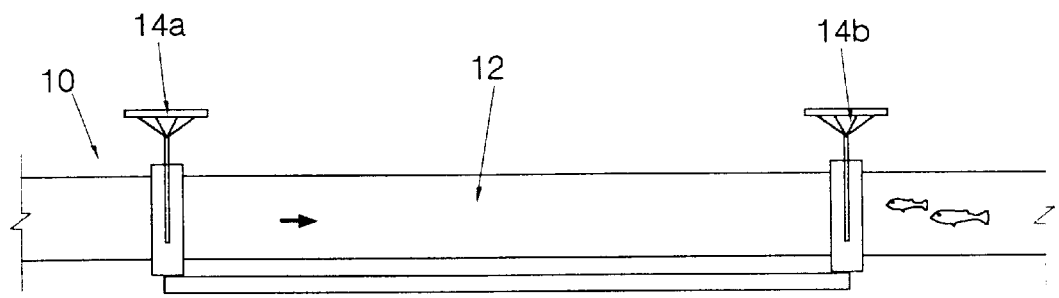
Figure 7:
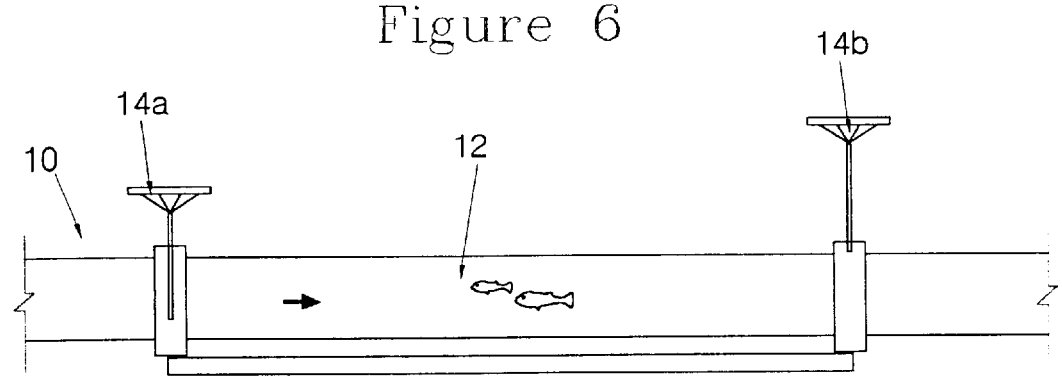
Figure 8:
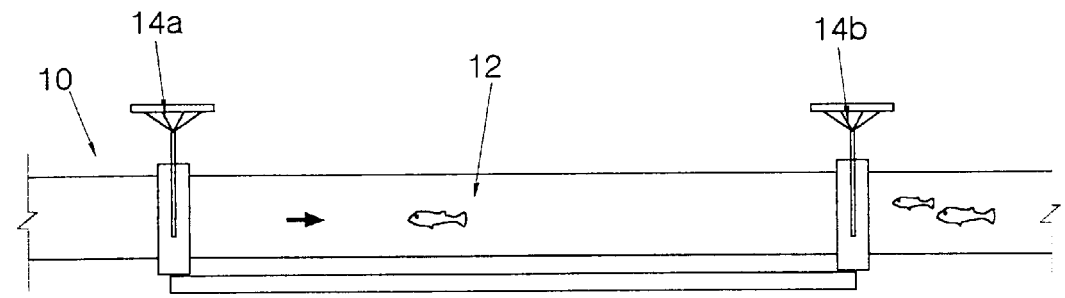
Figure 9:
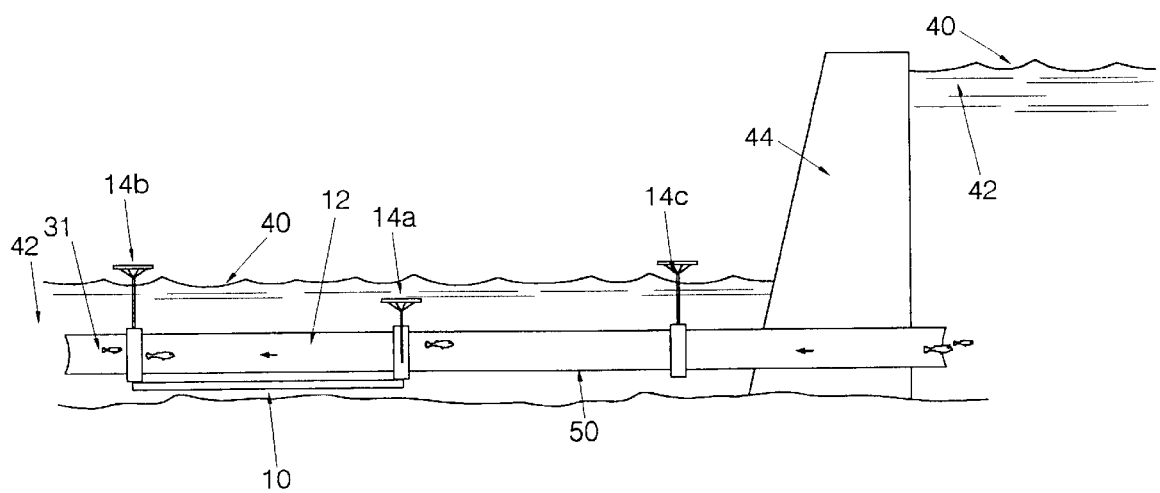
FIG. 9 is a section view of a second alternate installment embodiment of the apparatus of the present invention showing the apparatus extending through a lower portion of the obstruction.
Figure 10:
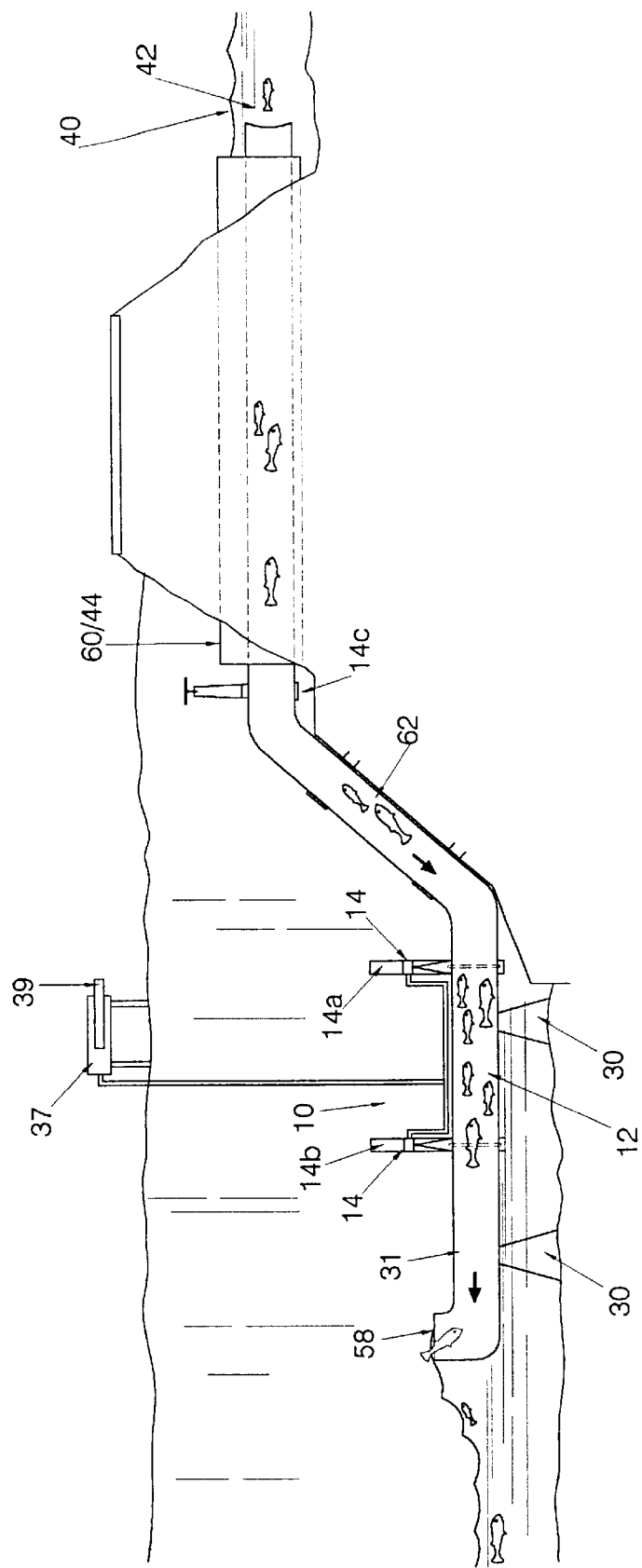
FIG. 10 is a section view of a culvert application of the apparatus of the present invention.

In the second stage, as shown in FIGS. 6 and 7, the fish that have collected prior to the unit 10 downstream of valve 14b are now allowed to enter the unit 10. The low flow rate acclimates the fish to the normal flow rate that is higher than the acclimation fluid flow at the upstream side of the obstruction 44.

Finalizing the second stage (FIG. 8), valve 14b is closed except to the acclimation flow, and valve 14a begins to open to allow fish to swim upstream with minimal exertion and with no anticipated injuries resulting during the transition from downstream of the obstruction 44 to upstream of the obstruction 44.

Once all of the fish have exited the passageway 12 of unit 10, the cycle is repeated until all of the migratory fish have passed.

The cycling times in which valve 14a will open and ultimately close in concert with valve 14b's opening and closing will be determined by the type and quantity of fish migrating through the unit 10. The cycling times can be manually adjusted at the remote control unit 37 by a field marine biologist or electronically controlled by a marine biologist based on projected data. For example, during peak migration of Pacific Northwest salmon, the cycling time between the two stages may be 20 minutes.

Valves 14a and 14b can be modified to obtain more precise flow rate through the addition of non-corrosive plates, e.g., stainless steel, to the valve opening.

An optional valve 14c, which may be similar to valves 14a and 14b, may be added to the system upstream from the unit 10 but prior to the obstruction 44. Alternatively, valve 14c may be positioned on the upstream side of the obstruction 44 (not shown). Valve 14c acts as a main shut-off valve. Valve 14c may be controlled by the remote controller, but would also preferably include a manual means for closure.

Often passageway 12 will need to be extended to, through, or over the obstruction 44. This can be accomplished by extending passageway 12 beyond valves 14a and 14b, or a new passageway, or pipe, 50 can be permanently installed to, through, or over the obstruction 44. The passageway 12 of unit 10 can be seasonally connected to the passageway 50, if the unit 10 is to be moved regularly.

It is desired to allow the fish, once upstream of the obstruction 44, to exit near the surface of the water as the surface is where the individual stream attractant "aroma" may be for the migrating fish. To assist fish exiting the obstruction close to the surface, a flexible connector 52 and a float 54 may be used. The flexible connector 52 and the float 54 are an improvement over the prior art in that the float 54 can adjust for varying head levels unlike concrete box-type fish ladders.

The flexible connector 52 may be connected to the additional passageway 50 directly upstream from the obstruction 44.

The float 54 may be attached to a further extension 56 of the passageway 12, which further extension 56 extends into the upstream body of water. The float 54 (such as a styrofoam block), in conjunction with the flexible connector 52, adjusts the further extension 56 of the passageway 12 to varying water levels. This aids the fish when the head differential is greatest, such as at large dams. Further extension 56 of the passageway 12 may be either straight, or may have an angle in the range of 0 degrees to 180 degrees from a straight longitudinal axis of the passageway 12. A pair of guy cables 55 may be added to aid in keeping the float toward the center of the stream or other flowing body of water.

A conventional attraction flow device 58, such as a concrete bucket that provides downstream spillover typically used in conventional fish ladders may be added to aid in directing fish to the unit 10 passageway 12.

The unit 10 may also be used for culvert applications. The unit 10 is positioned as close to the culvert 60 as is feasible. A flexible passageway 62 mates upstream to the passageway 12 in the unit 10. Alternatively, the flexible passageway 62 and unit 10 may be a single integral unit. Valves 14a and 14b are cycled through the first and second stages as discussed above to assist the fish in entering and passing through a culvert opening without the need for complex and lengthy piping systems. Because of the ease of installation and relatively low cost, the unit 10 is ideal for many urban culvert applications.

An alternative embodiment of a culvert application provides that an alternate passageway, or pipe, 63 may extend through the obstruction 44, adjacent the culvert 60, because the water volume is likely to be reduced in the culvert application.

Figure 11:
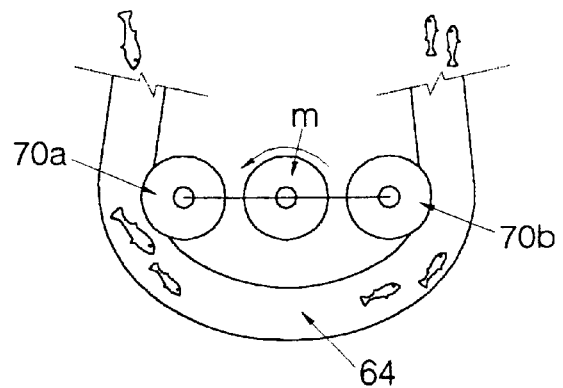
FIG. 11 is a plan view of an alternate embodiment of the apparatus of the present invention.

The unit 10 does not have to be linear with a straight through passageway 12. As shown in FIG. 11, the unit 10 may have a flexible passageway, or hose, 64 with a pair of idler rollers 70a and 70b, with a motor timed for rotation speed therebetween. Idler rollers 70a and 70b are timed to laterally restrict the flow rate at staged times by compressing flexible passageway 64 to preset opening levels.

Figure 13:
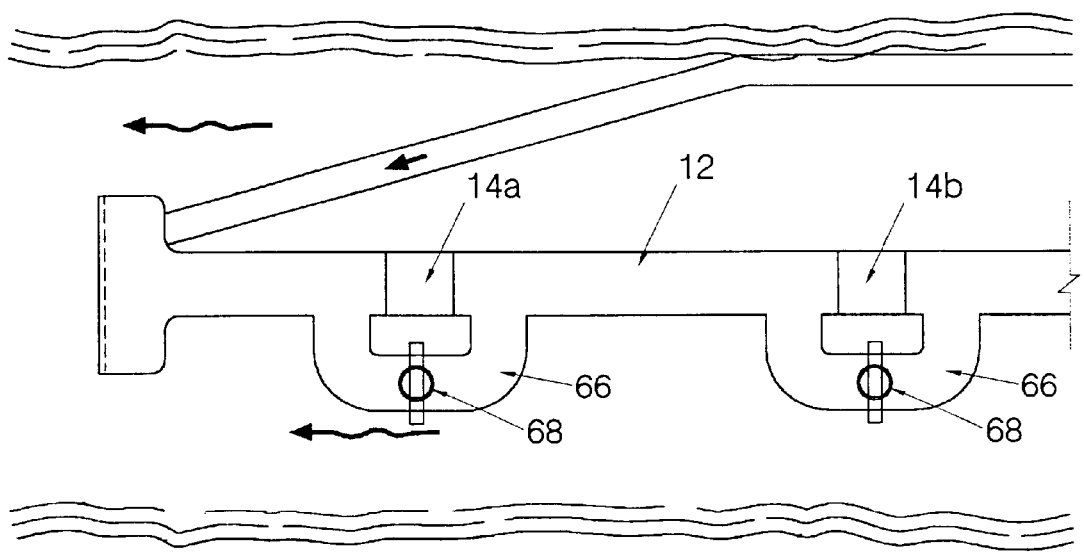
Figure 12:
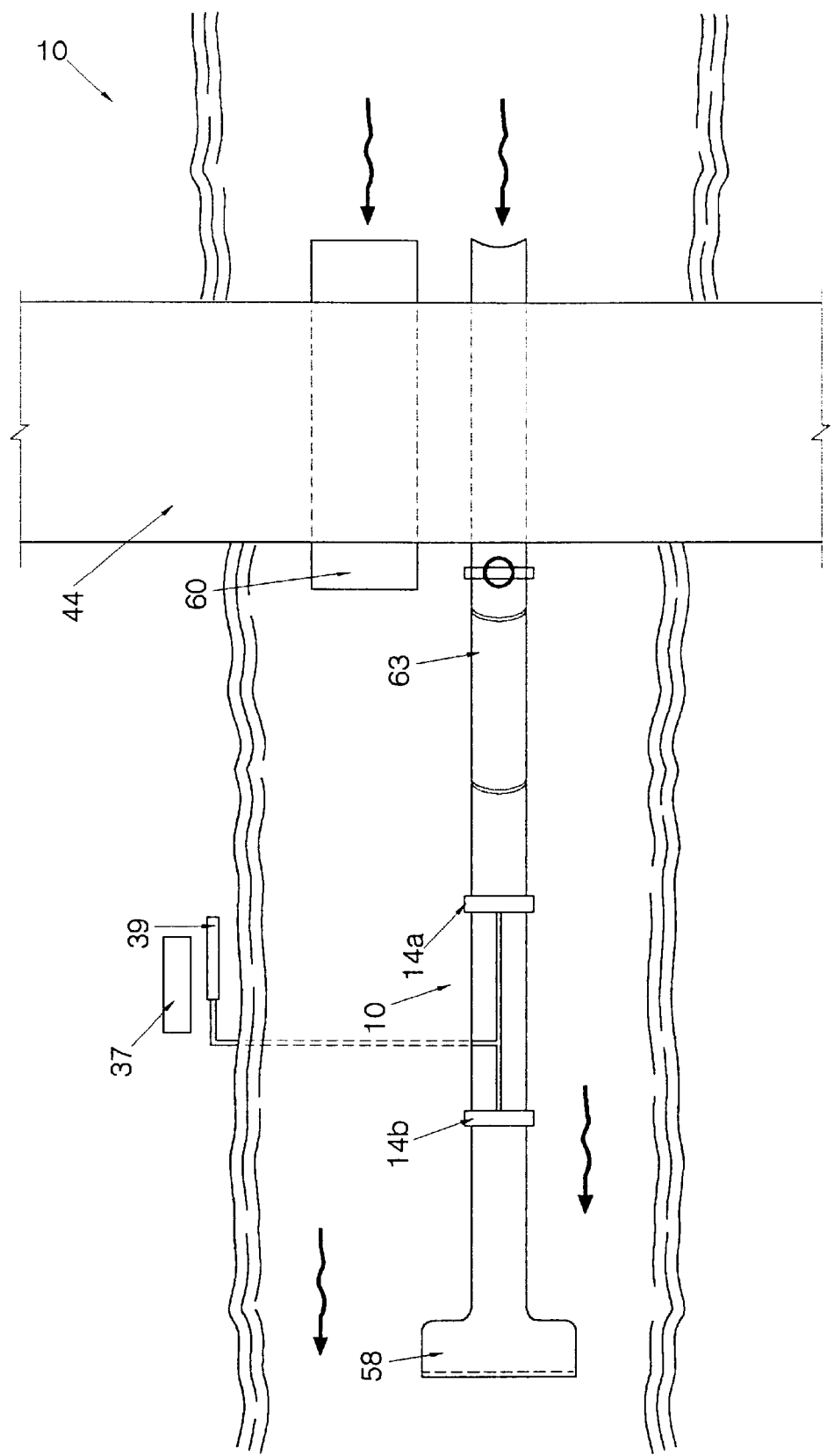
FIG. 12 is a perspective view of an alternate embodiment of the culvert application of the apparatus of the present invention; and, FIG. 13 is a plan view of an alternate embodiment of the apparatus of the present invention showing the diversion pipe system.

As shown in FIG. 13, an alternative embodiment of the unit 10 provides for diversion pipes 66 around valves 14a and 14b. Diversion pipes 66 each contain a separate valve 68, which valves 68 operate the same as valves 14a and 14b. Diversion pipes 66 provide for control of the flow rate through valves 14a and 14b by allowing for the complete opening and closing of valves 14a and 14b through the cycling period. Utilization of the diversion pipes 66 should prevent the fish in the passageway 12 from backing up at valves 14a and 14b and potentially becoming pinned against said valves 14a and 14b.

In the preferred form, valves 14a and 14b are identical to allow the unit 10 to be easily used for either upstream or downstream fish passage applications. The unit 10 can be used for downstream applications when young fish need to get past an obstruction in a downstream migration.

The present invention is much less costly that conventional fish ladders, requires little maintenance, and is portable. Additionally, the present invention is environmentally compatible by being less disruptive than conventional permanent piping systems and fish ladders. The present invention requires only enough water flow to attract the migrating fish to a submersible entry and the fish need only to expend the energy to overcome the present internal (acclimation) flow.

As to the manner of usage and operation of the apparatus for reduced flow rate fish passage of the present invention, the same be apparent from the above description.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification and intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. As such, the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

While particular embodiments of the invention have been shown and described, it will be understood that the invention is not limited thereto, since modifications may be made that will become apparent to those skilled in the art.

What is claimed is:

1. An apparatus for reduced flow rate fish passage, comprising:
   a passage unit;
   said passage unit having a tubular passageway or pipe therein; said passage unit having a pair of valves, said pair of valves being an upstream valve and a downstream valve and being used to close off said tubular passageway at or near each end of said passage unit;
   said passage unit having a fabricated base, said fabricated base supporting said tubular passageway and aiding in spacing and supporting said pair of valves;
   an attraction flow device, said attraction flow device providing downstream spillover to aid in directing fish to said passage unit;
   an additional passageway or pipe, said additional passageway or pipe extending from said obstruction to said attraction flow device and having a valve to close off said additional passageway;
   said tubular passageway and said pair of valves being connected to said fabricated base by a plurality of support straps;
   said valves having an opening, a closing means, a valve stem, and an operator to close off said opening;
   said unit being installed essentially parallel to and below the surface of a water body and adjacent to an obstruction of which the fish must pass;
   said pair of valves being synchronized for two-stage opening; and,
   an optional valve, which optional valve is a main shut-off valve.

2. The apparatus for reduced flow rate fish passage of claim 1, further comprising said base including at least one stanchion, said stanchion being bolted or otherwise connected to said base.

3. The apparatus for reduced flow rate fish passage of claim 1 further comprising an access pipe, said access pipe being added to said passage unit as a waiting area for fish until said downstream valve is opened.

4. The apparatus for reduced flow rate fish passage of claim 1 further comprising said passage unit being in the range of four feet wide by five feet high.

5. The apparatus for reduced flow rate fish passage of claim 1 further comprising said passage unit being in the range of 20–24 feet in length between said upstream valve and said downstream valve.

6. The apparatus for reduced flow rate fish passage of claim 1 further comprising said passageways being oval, square, circular, or rectangular.

7. The apparatus for reduced flow rate fish passage of claim 1 further comprising said passageways being made from plastic, non-corrosive metal, or concrete.

8. The apparatus for reduced flow rate fish passage of claim 1 further comprising said passageway being made from transparent material.

9. The apparatus for reduced flow rate fish passage of claim 1 further comprising said passageway having sensors to send a signal to a remote controller for cycling of said upstream valve and said downstream valve.

10. The apparatus for reduced flow rate fish passage of claim 1 further comprising said upstream valve and said downstream valve being a knife gate valve, an iron gate valve, a ball gate, or check gate, that will close a cross-sectional opening and also be capable of partially closing in order to leave a small amount of fluid passing through said valves.

11. The apparatus for reduced flow rate fish passage of claim 1 further comprising said valve stems being positioned downward.

12. The apparatus for reduced flow rate fish passage of claim 1 further comprising said valves being manually controlled and operated.

13. The apparatus for reduced flow rate fish passage of claim 1 further comprising said valves being remotely pneumatically controlled.

14. The apparatus for reduced flow rate fish passage of claim 13 further comprising a pneumatic line running from each of said upstream valve and said downstream valve to a remote control unit and a compressor.

15. The apparatus for reduced flow rate fish passage of claim 14 further comprising an actuator and a positioner being connected to each of said upstream valve and said downstream valve.

16. The apparatus for reduced flow rate fish passage of claim 1 further comprising an actuator and a positioner being connected to said optional valve.

17. The apparatus for reduced flow rate fish passage of claim 15 further comprising a control unit, said control unit being software controlled or electro-mechanically controlled.

18. The apparatus for reduced flow rate fish passage of claim 16 further comprising a compressor, said compressor being capable of producing at least 80 psi.

19. The apparatus for reduced flow rate fish passage of claim 1 further comprising said upstream valve and said downstream valve being modified to obtain more precise flow rate through the addition of non-corrosive plates.

20. The apparatus for reduced flow rate fish passage of claim 1 further comprising said passageway being extended to, through, or over said obstruction.

21. The apparatus for reduced flow rate fish passage of claim 20 further comprising said passageway being extended beyond said upstream valve and said downstream valve by means of a new passageway being permanently installed to, through, or over said obstruction.

22. The apparatus for reduced flow fish passage of claim 1 further comprising a flexible connector and a float, said flexible connector and said float being used to adjust for varying head levels.

23. The apparatus for reduced flow rate fish passage of claim 22 further comprising said flexible connector being connected to said additional passageway directly upstream from said obstruction.

24. The apparatus for reduced flow rate fish passage of claim 23 further comprising said float being attached to a further extension of said passageway, said further extension extending into the upstream body of water and extending from 0 degrees to 180 degrees from a straight longitudinal axis of said passageway.

25. The apparatus for reduced flow rate fish passage of claim 24 further comprising a pair of guy cables being added to aid in keeping said float toward the center of the stream or other flowing body of water.

26. The apparatus for reduced flow rate fish passage of claim 1 further comprising a flexible passageway or hose with a pair of idler rollers and a motor timed for rotation speed therebetween.

27. The apparatus for reduced flow rate fish passage of claim 1 further comprising diversion pipes around said upstream valve and said downstream valve, said diversion pipes each having a separate valve.

* * * * *